G. R. WILLIAMS.
VEHICLE WHEEL.
APPLICATION FILED SEPT. 11, 1907.

921,493.

Patented May 11, 1909.
2 SHEETS—SHEET 1.

WITNESSES

INVENTOR
George R. Williams
BY
ATTORNEYS

G. R. WILLIAMS.
VEHICLE WHEEL.
APPLICATION FILED SEPT. 11, 1907.

921,493.

Patented May 11, 1909.
2 SHEETS—SHEET 2.

WITNESSES
E. G. Bromley
J. Fed. Opkes

INVENTOR
George R. Williams
BY
[signature]
ATTORNEYS

UNITED STATES PATENT OFFICE.

GEORGE RAINEY WILLIAMS, OF LITTLE ROCK, ARKANSAS.

VEHICLE-WHEEL.

No. 921,493.

Specification of Letters Patent.

Patented May 11, 1909.

Application filed September 11, 1907. Serial No. 392,312.

*To all whom it may concern:*

Be it known that I, GEORGE RAINEY WILLIAMS, a citizen of the United States, and a resident of Little Rock, in the county of Pulaski and State of Arkansas, have invented a new and useful Improvement in Vehicle-Wheels, of which the following is a full, clear, and exact description.

The purpose of the invention is to provide a wheel for carriages, automobiles and like vehicles, that will possess within itself substantial, effective, and efficient resilience without detracting from its supporting qualities, and to provide a simple, durable, and economic construction wherein a resilient tire is combined with compensating spokes.

Another purpose of the invention is to provide a wheel with a centrally located cone brace that will give the spokes a lateral support on the dish of the wheel and which brace may be utilized as a braking surface.

The invention consists in the novel construction and combination of the several parts as will be hereinafter fully set forth and pointed out in the claims.

Reference is to be had to the accompanying drawings forming a part of this specification in which similar characters of reference indicate corresponding parts in all of the figures.

Figure 1:
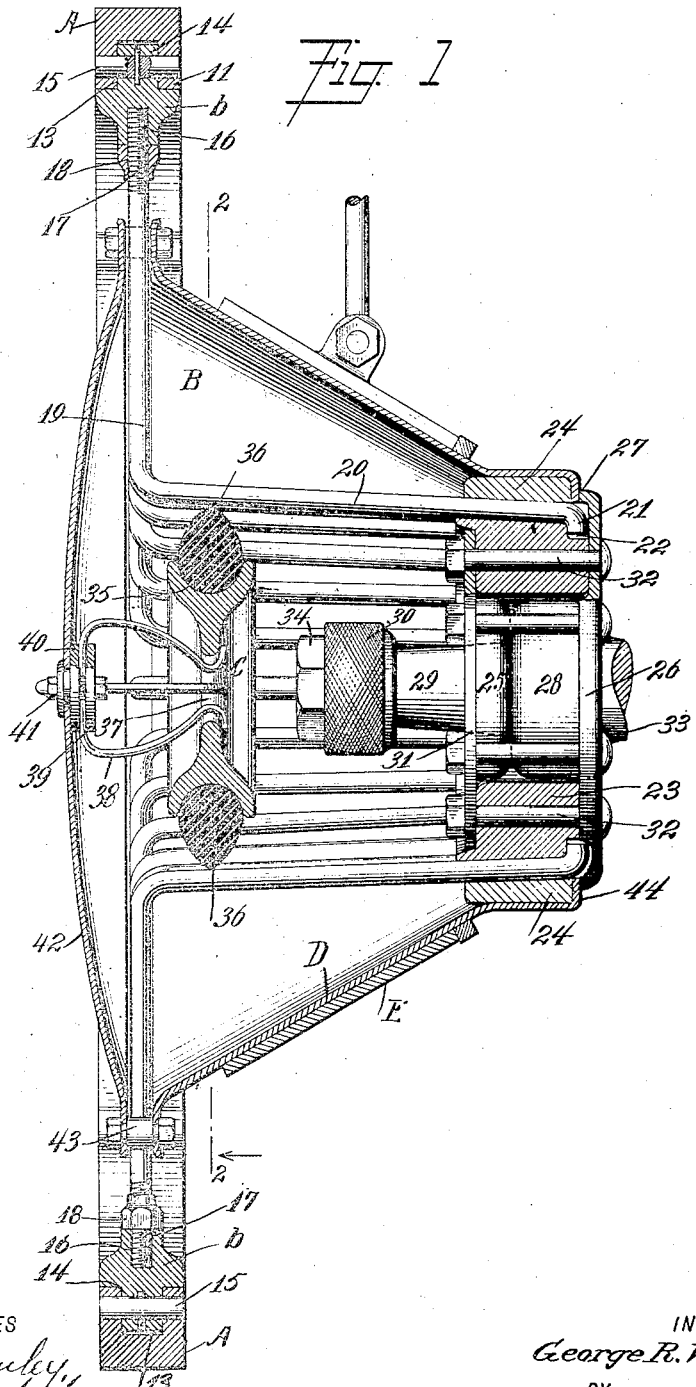
Figure 2:
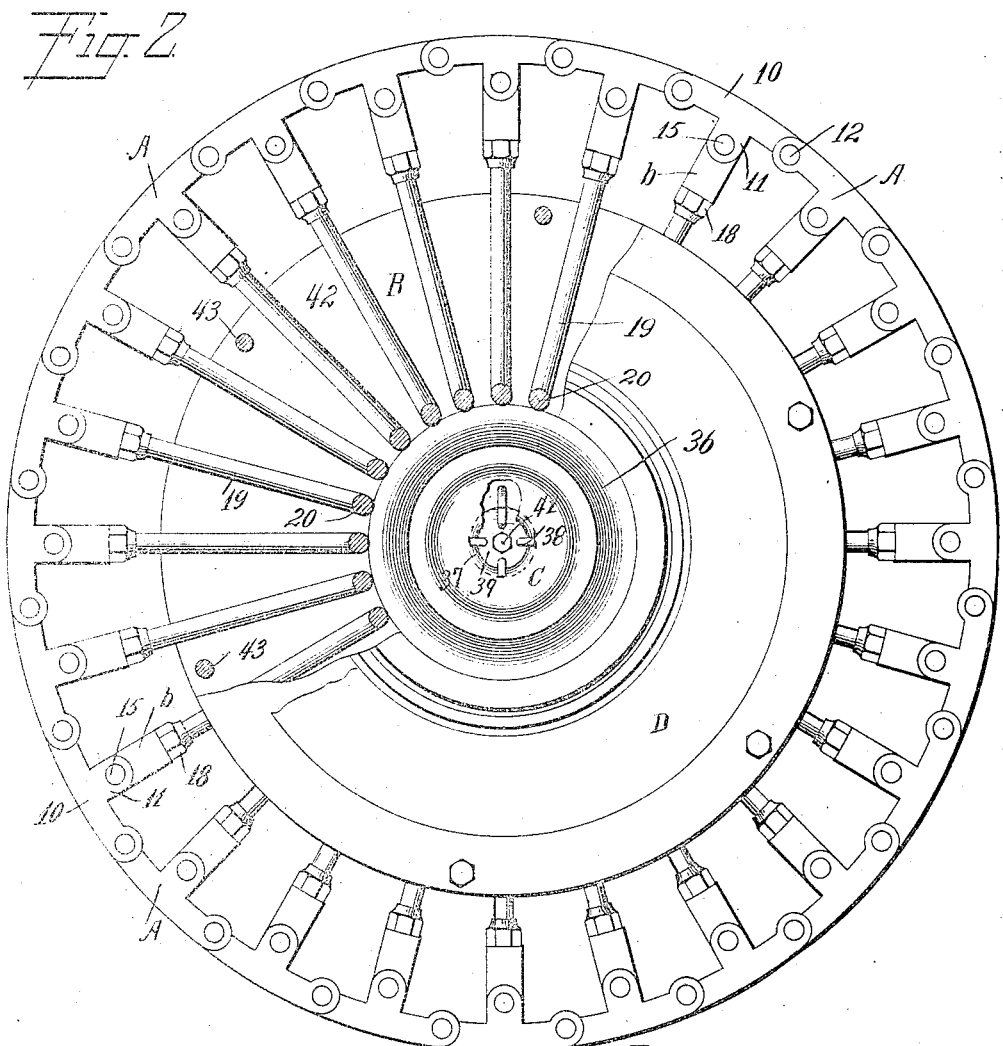
Figure 3:
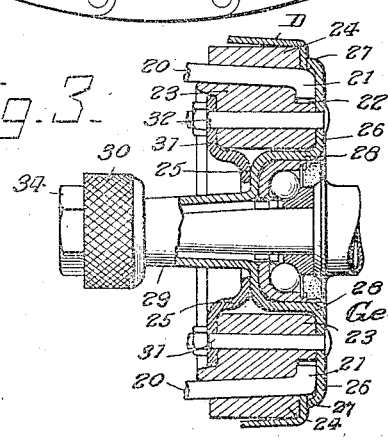

Figure 1 is a vertical section through the improved wheel; Fig. 2 is a section through the wheel taken at the rear and practically on the line 2—2 of Fig. 1, the cone brace, however, appearing partly in rear elevation and partly broken away, and Fig. 3 is a detail sectional view of the hub.

The tire of the wheel is a yielding tire, and may be constructed in many ways to produce the desired result, but preferably the tire is constructed, as is shown in the drawings, wherein it consists of a series of substantially T-shaped members, each member embracing a tread section 10, and an inwardly extending centrally located shank section 11. The tread sections 10 of the tire members A are pivotally connected by bolts 12 in any suitable or approved manner, and the pivotal connection is so made that the tread surfaces of the tread sections 10 will be smooth and continuous, in this manner a circular continuous yielding tire is produced.

In connection with each of the tire members A a cap end *b*, adapted to be carried at the outer ends of the spokes B, is produced, and each cap end *b* is provided with a reduced outer end member 14 that enters a suitable cavity in the shank section of a tire member A, as is shown in Fig. 1, and bolts 15 are passed through the reduced portions 14 of the said cap members and through the shank sections of the tire members, pivotally connecting such parts. The cap members *b* have firm bearing against the under faces of the shank sections 11 of the tire members A, and at the inner end portions of the said cap members *b*, interiorly threaded sockets 16 are produced, and these sockets receive the threaded outer ends 17 of the spokes B, and each threaded portion 17 of the spoke carries a nut 18 that is screwed up to an engagement with the inner end of the cap member into which the spoke may be introduced. Each spoke is constructed of spring rod metal and is of angular formation, consisting of a straight supporting member 19 that is introduced into a cap end *b* and a rearwardly extending horizontal member 20 that terminates at its rear end in an inwardly extending bend 21, as is clearly shown in Fig. 1. The horizontal members 20 of the spokes B are spring members and serve to make the wheel in its entirety a perfectly resilient wheel, while the straight, outwardly extending members 19 effectually support the tire of the wheel.

The hub of the wheel is constructed in the following manner: A ring 23, which may be termed a hub ring, is provided at its periphery with recesses 22, in which recesses the rear end portions of the spring members 20 of the spokes B are received, and a binding ring 24 is then forced over the hub ring 23 to a locking engagement with the ends of the spokes received by the said hub ring, as is shown in Figs. 1 and 3. In connection with the hub ring 23 a hub proper is provided; this hub is in two sections, the outer section consisting of a dished member 25 having a flange 31 engaging the outer face of the hub ring 23, the concave surface of the said member facing forwardly, or in the direction of the outer face of the wheel proper; the other section of the hub consists of the dished member 28, which is dished in a reverse direction to that of the member 25 and has an annular flange 26 which engages with the inner face of the hub ring 23 and is provided with a forwardly extending marginal member 27 that is located opposite the binding ring 24, as is also shown in Figs. 1 and 3. The inner dished member 28 is provided with an outwardly extending tubular extension 29, and this extension 29 carries at its outer end a box 30 which may be removable, and the said box is usually provided with ball bearings. The flanges 26 and 31 are secured to the hub ring 23 by means of suitable bolts 32, and in this manner the sections of the hub are held together, and likewise the binding ring is prevented from slipping from the hub ring. The spindle 33 of the axle is received within the said hub, passing through suitable openings in the dished members thereof, and the outer end portion of the received spindle is engaged by the aforesaid ball bearings, which may be dispensed with if desired, and a suitable nut 34 is located at the outer end of the spindle, as is also shown in Fig. 1.

The spring members 20 of the series of spokes B practically constitute a spring cage, within which cage adjacent the outer face of the wheel proper, or adjacent where the members 19 and 20 connect, a distributing disk C is located, of lesser diameter than the diameter of the said cage. This disk C is provided with a peripheral groove 35, and in this groove 35, a ring 36 of rubber or other elastic or yielding material, is located, and this yielding or elastic ring 36 forcibly engages with the inner faces of the spring members 20 of the spokes, as is shown in Figs. 1 and 2. This distributing disk and its accompanying elastic or yielding ring, constitute a yielding bearing for the spring sections or members of the spokes, and the said bearings serve to transmit the force or weight past one spoke to other spokes, whereby the excess of weight or force applied to one resilient spring member 20 of a spoke is transferred, and the force is automatically distributed proportionately to the resistance. It may be here stated that the tire has a resiliency corresponding to the resiliency of the spring members of the spokes.

The distributing disk C may be held in position in any suitable or approved manner, usually, however, it is provided with a central opening 37 into which opening the rear curved ends of spring arms 38 are sprung, having a clamping engagement with the wall of the said opening 37, and the outer ends of these spring arms 38 are held between two clamping disks 39 and 40 by means of a suitable bolt 41, and this bolt 41 is passed through the central portion of an outer convexed brace disk 42, the bolt passing through the center of the disk and being provided with suitable nuts and washers. The outer brace disk 42 at its marginal portion is made to stand near but not against the outer face of the supporting members 19 of the spoke B, and in connection with this outer convexed disk brace 42, I employ a cone brace D that is located at the rear of the wheel, and the larger end portion of the cone brace D is made to stand near but not against the rear face of the supporting members 19 of the spokes B, and the two braces are held together but not clamped against the spokes, by means of suitable bolts 43.

The reduced or rear end of the cone brace D is made to fit over the binding ring 24, as is shown in Fig. 1, and the rear end portion of the said cone brace is provided with an inwardly extending flange 44 that engages the rear face of the binding ring 24 and is engaged by the forwardly extending marginal member 27 of the rear ring flange 26. This cone brace is exceedingly effective since it gives the spokes a lateral support on the dish of the wheel. The cone brace D is likewise serviceable in another direction, since the strap brake E may be made to engage with its outer face and in this manner the cone brace offers a bearing surface for a brake of any suitable description.

Having thus described my invention, I claim as new and desire to secure by Letters Patent,—

1. In a vehicle wheel, a yielding tire, a hub, angular spokes constructed of spring material, one member of each spoke being radially disposed and connected with the tire, and the other member being horizontally disposed and connected with the hub, an outer brace disk and an inner cone brace secured to the hub and brace disk.

2. In vehicle wheels, a yielding tire, a hub to the rear of the body of the wheel and a series of angular spokes constructed of spring material and constituting the body of the wheel, one member of each spoke being radially disposed and secured to the tire, the other member being parallel with the axis of the wheel and secured to the hub, inner and outer braces, the inner one being secured to the hub, and a yielding support for the members of the spokes extending parallel with the axis, said support being located within the group of said members and carried by the outer brace.

3. In a vehicle wheel, a yielding tire, a hub to the rear of the face of the wheel, substantially L-shaped spokes of spring material, each spoke comprising a radial member connected with the tire, and a horizontal member connected with the hub, a yielding support in engagement with all of the horizontal members at a point between their ends, and a cone brace extending from the radial members of the spokes at the rear face of the wheel and secured to the said hub, which cone brace surrounds the horizontal members of the spokes.

4. In a vehicle wheel, a yielding tire, a hub to the rear of the face of the wheel, substantially L-shaped spokes of spring material, each spoke comprising a radial member connected with the tire, and a horizontal member connected with the hub, a yielding support in engagement with all of the horizontal members at a point between their ends, a cone brace at the rear face of the wheel and secured to the said hub, which cone brace surrounds the horizontal members of the spokes, a convexed disk brace located at the outer face of the wheel, being secured to the cone brace, and means carried by the said disk brace for holding the said supporting member in position.

5. In a vehicle wheel, a hub having a ring at its inner end, said ring having a plurality of peripheral recesses, angular spokes having their horizontal members in the recesses of said ring, a binding ring on the first named ring, a cone brace secured over the binding ring and extending to the radial members of the spokes, and a yielding tire to which the radial members of the spokes are pivoted.

6. In a vehicle wheel, a hub having spaced flanges at its inner end, the inner flange having an outwardly extending marginal member, a ring held between the flanges and having peripheral recesses, angular spokes having their horizontal members in the said recesses, a binding ring on the first named ring, a cone brace having an inwardly extending flange at its inner end and fitting upon the binding ring, said cone brace extending to the radial members of the spokes, and a yielding tire to which the radial members of the spokes are pivoted.

7. In a vehicle wheel, a hub, angular spokes having their horizontal members secured to the hub, a yielding tire to which the radial members of the spokes are secured, a cone brace secured to the hub and extending to the radial members of the spokes, a disk brace secured to the cone brace, an apertured disk carrying yielding material in its periphery, and spring arms carried by the brace disk and engaging the aperture of the said disk.

8. In a vehicle wheel, a hub, an outer disk brace, an inner cone brace secured to the hub and to the disk brace, angular spokes having their horizontal members secured to the hub and their radial members extending loosely between the braces at the points of connection, a yielding tire to which the radial members of the spokes are secured, a ring of yielding material in engagement with the horizontal members of the spokes, and means for supporting said ring from the outer brace.

9. In a vehicle wheel, a hub, an outer disk brace, an inner cone brace secured to the hub and to the disk brace, angular spokes having their horizontal members secured to the hub and their radial members extending loosely between the said braces at their points of connection, a yielding tire to which the radial members of the spokes are secured, a ring of yielding material in engagement with the horizontal members of the spokes, a carrier for the ring, and means for yieldingly supporting the said carrier from the disk brace.

In testimony whereof I have signed my name to this specification in the presence of two subscribing witnesses.

GEORGE RAINEY WILLIAMS.

Witnesses:
 FRANK WITTENBERG
 A. H. COLLINS.